(12) United States Patent
Dietz et al.

(10) Patent No.: US 11,074,766 B2
(45) Date of Patent: *Jul. 27, 2021

(54) MANAGING A VEHICLE INCIDENT

(71) Applicant: International Business Machines Corporation, Armonk, NY (US)

(72) Inventors: William R. Dietz, Raleigh, NC (US); William R. Holtzhauser, III, Clayton, NC (US); Ajit Jariwala, Cary, NC (US); Francesco C. Schembari, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 281 days.

This patent is subject to a terminal disclaimer.

(21) Appl. No.: 14/477,669

(22) Filed: Sep. 4, 2014

(65) Prior Publication Data

US 2015/0356793 A1 Dec. 10, 2015

Related U.S. Application Data

(63) Continuation of application No. 14/296,969, filed on Jun. 5, 2014, now Pat. No. 9,685,007.

(51) Int. Cl.
*G07C 5/00* (2006.01)
*B60R 25/30* (2013.01)
(Continued)

(52) U.S. Cl.
CPC ............ *G07C 5/00* (2013.01); *B60Q 9/00* (2013.01); *B60R 25/30* (2013.01); *G07C 5/085* (2013.01); *G07C 5/008* (2013.01)

(58) Field of Classification Search
CPC ...... G07C 5/085; G07C 5/0891; G07C 5/008; G07C 5/00; H04L 67/12; H04W 4/046; B60R 25/30; B60Q 9/00
(Continued)

(56) References Cited

U.S. PATENT DOCUMENTS 5,181,010 A * 1/1993 Chick ................ B60R 25/1004
307/10.2
5,689,442 A 11/1997 Swanson et al.
(Continued)

FOREIGN PATENT DOCUMENTS

CN 200953632 Y 9/2007
CN 103940570 A * 7/2014
(Continued)

OTHER PUBLICATIONS

Dongwei et al., "Robustness Analysis of Magnetic Sensor Arrays for Current Sensing," 2011, Publisher: IEEE.*
(Continued)

*Primary Examiner* — Tuan C To
(74) *Attorney, Agent, or Firm* — Nathan M. Rau

(57) ABSTRACT

A system and computer implemented method for managing a vehicle incident is disclosed. The method may include monitoring, in response to a triggering event, a first vehicle having a first vehicle state including a set of physical condition characteristics. The method may also include detecting, for the first vehicle, a vehicle incident including a change of one or more physical condition characteristics of the set of physical condition characteristics. The method may also include collecting, in response to detecting the vehicle incident for the first vehicle, incident circumstance information including a set of potential causes of the vehicle incident. In certain embodiments, the method may include providing incident data based on at least a portion of the incident circumstance information and at least a portion of the change of one or more physical condition characteristics.

20 Claims, 5 Drawing Sheets

(51) Int. Cl.
*B60Q 9/00* (2006.01)
*G07C 5/08* (2006.01)

(58) Field of Classification Search
USPC ............... 701/1, 32.2–32.7, 33.4; 340/8.1;
345/467; 370/328
See application file for complete search history.

(56) References Cited

U.S. PATENT DOCUMENTS

| | | | | |
|---|---|---|---|---|
| 6,119,074 | A * | 9/2000 | Sarangapani | G05B 23/0232 701/1 |
| 6,211,777 | B1 * | 4/2001 | Greenwood | B60Q 1/52 180/272 |
| 6,223,125 | B1 * | 4/2001 | Hall | G08G 1/164 701/117 |
| 6,696,931 | B2 * | 2/2004 | Paranjpe | B60Q 9/006 340/436 |
| 7,319,848 | B2 * | 1/2008 | Obradovich | G01C 21/26 340/425.5 |
| 7,742,936 | B2 * | 6/2010 | Wahlbin | G06Q 10/10 705/4 |
| 8,311,858 | B2 | 11/2012 | Everett et al. | |
| 9,373,149 | B2 * | 6/2016 | Abhyanker | G06Q 50/28 |
| 9,524,269 | B1 * | 12/2016 | Brinkmann | G06F 17/00 |
| 9,558,667 | B2 * | 1/2017 | Bowers | G08G 1/16 |
| 2003/0169183 | A1 * | 9/2003 | Korepanov | G07F 17/246 340/932.2 |
| 2005/0037730 | A1 | 2/2005 | Montague | |
| 2005/0273218 | A1 * | 12/2005 | Breed | B60C 11/24 701/2 |
| 2006/0208169 | A1 * | 9/2006 | Breed | B60N 2/002 250/221 |
| 2006/0273922 | A1 * | 12/2006 | Bhogal | G08G 1/0175 340/901 |
| 2007/0210935 | A1 * | 9/2007 | Yost | G07B 15/02 340/932.2 |
| 2008/0252485 | A1 | 10/2008 | Lagassey | |
| 2008/0262670 | A1 * | 10/2008 | McClellan | G01S 5/0027 701/31.4 |
| 2008/0294690 | A1 * | 11/2008 | McClellan | G01S 5/0027 |
| 2010/0123779 | A1 | 5/2010 | Snyder et al. | |
| 2011/0316682 | A1 | 12/2011 | Pan | |
| 2012/0105635 | A1 | 5/2012 | Erhardt et al. | |
| 2012/0143490 | A1 | 6/2012 | Hung | |
| 2012/0146766 | A1 | 6/2012 | Geisler et al. | |
| 2013/0203400 | A1 * | 8/2013 | Ricci | H04W 4/046 455/418 |
| 2014/0094995 | A1 * | 4/2014 | Scott | G07C 5/008 701/1 |
| 2014/0121893 | A1 * | 5/2014 | Larschan | G07C 5/085 701/33.4 |
| 2014/0143839 | A1 * | 5/2014 | Ricci | H04W 12/06 726/4 |
| 2014/0278840 | A1 * | 9/2014 | Scofield | G07C 5/008 705/13 |
| 2014/0306799 | A1 * | 10/2014 | Ricci | B60Q 1/00 340/5.83 |
| 2014/0306833 | A1 * | 10/2014 | Ricci | G07C 9/00158 340/901 |
| 2014/0343751 | A1 * | 11/2014 | Berkobin | G07C 5/008 701/1 |
| 2014/0343785 | A1 * | 11/2014 | Crawford | G06Q 40/08 701/29.4 |
| 2014/0358356 | A1 * | 12/2014 | Jones | G07C 5/008 701/31.4 |
| 2014/0358358 | A1 * | 12/2014 | Jones | G07C 5/008 701/31.4 |
| 2015/0039175 | A1 * | 2/2015 | Martin | G06Q 40/08 701/31.5 |
| 2015/0058045 | A1 * | 2/2015 | Santora | G08G 1/162 705/4 |
| 2015/0112542 | A1 * | 4/2015 | Fuglewicz | G07C 5/0858 701/32.2 |
| 2015/0112570 | A1 * | 4/2015 | Schmudderich | G01S 7/411 701/93 |
| 2015/0127570 | A1 * | 5/2015 | Doughty | G06Q 50/265 705/325 |
| 2015/0229889 | A1 * | 8/2015 | Boettiger | H04N 9/09 348/262 |
| 2015/0314780 | A1 * | 11/2015 | Stenneth | G05D 1/0061 701/23 |
| 2015/0332587 | A1 * | 11/2015 | Schwarz | G01D 4/002 340/933 |
| 2015/0371092 | A1 * | 12/2015 | Ghannam | G06K 9/00362 382/104 |
| 2016/0325680 | A1 * | 11/2016 | Curtis | B60R 1/00 |

FOREIGN PATENT DOCUMENTS

| | | | | |
|---|---|---|---|---|
| EP | 2174231 | A2 | 4/2010 | |
| EP | 2360654 | A1 | 8/2011 | |
| EP | 2806288 | A1 * | 11/2014 | ......... G01S 17/931 |
| WO | WO-2014000891 | A2 * | 1/2014 | ............. E05F 15/46 |

OTHER PUBLICATIONS

V. Calloway et al., "Vehicle Tracking using a Network of Small Acoustic Arrays," 2004, vol. 3, Publisher: IEEE.*
Dietz, W., et al., "Managing a Vehicle Incident", U.S. Appl. No. 14/296,969, filed Jun. 5, 2014.
Mell, P., et al., "The NIST Definition of Cloud Computing", National Institute of Standards and Technology, Information Technology Laboratory. Version 15, Oct. 7, 2009.
List of IBM Patents or Patent Applications Treated as Related.

* cited by examiner

MANAGING A VEHICLE INCIDENT

BACKGROUND

The present disclosure relates to automotive vehicles, and more specifically, to managing a vehicle incident.

The number of incidents worldwide involving automotive vehicles is increasing year by year. A significant portion of these incidents go unreported. As the number of unreported vehicle-related incidents increases, the need to manage vehicle incidents may also increase.

SUMMARY

Aspects of the present disclosure, in certain embodiments, are directed toward a method and system for managing a vehicle incident. The method may include monitoring, in response to a triggering event, a first vehicle having a first vehicle state including a set of physical condition characteristics. In certain embodiments, the method may include detecting, for the first vehicle, a vehicle incident including a change of one or more physical condition characteristics of the set of physical condition characteristics. In certain embodiments, the method may also include collecting, in response to detecting the vehicle incident for the first vehicle, incident circumstance information including a set of potential causes of the vehicle incident. Additionally, in certain embodiments, the method may include providing incident data based on at least a portion of the incident circumstance information and at least a portion of the change of one or more physical condition characteristics.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
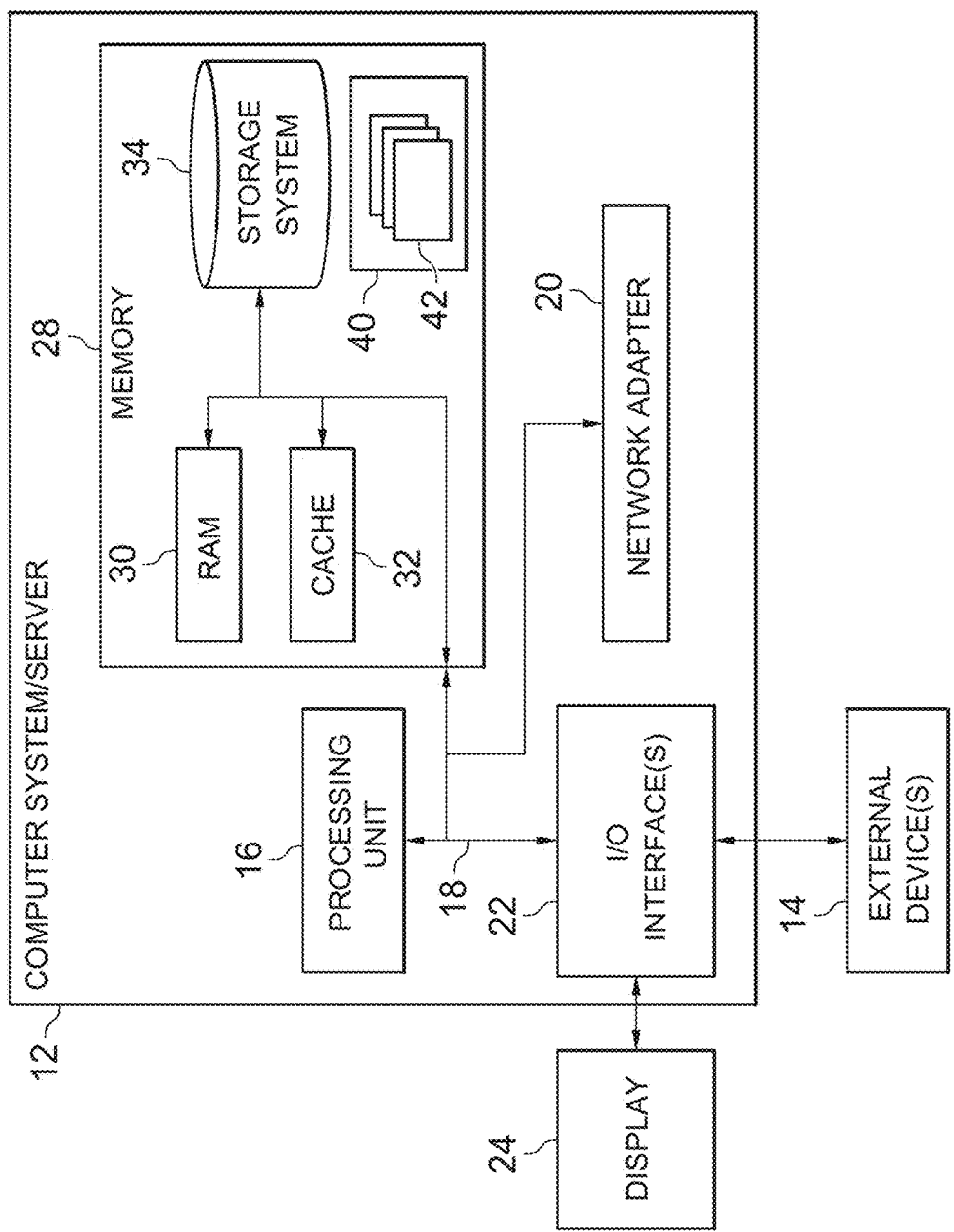
FIG. 1 depicts a cloud computing node according to an embodiment of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to various embodiments of a system and method for managing a vehicle incident (e.g., a parked car hit by another vehicle). More particular aspects relate to providing incident data based on collected information regarding the vehicle incident. The method may include monitoring, in response to a triggering event, a first vehicle having a first vehicle state including a set of physical condition characteristics. The method may include detecting, for the first vehicle, a vehicle incident including a change of one or more physical condition characteristics of the set of physical condition characteristics. The method further may include collecting, in response to detecting the vehicle incident for the first vehicle, incident circumstance information including a set of potential causes of the vehicle incident. Additionally, the method may include providing incident data based on at least a portion of the incident circumstance information and at least a portion of the change of one or more physical condition characteristics.

Since shortly after the introduction of the automobile, incidents involving vehicles have been increasing worldwide year by year. Vehicle incidents may result in imposed repair fees, costs, and other losses for those involved. Additionally, a significant portion of vehicle incidents each year go unreported to authorities. Furthermore, aspects of the present disclosure relate to the recognition that, in vehicle incidents involving two or more vehicles, determining the responsible party can prove challenging for all parties involved. Accordingly, aspects of the present disclosure are directed toward a method and system for managing a vehicle incident by collecting information related to the vehicle incident, including a set of potential causes of the vehicle incident. The method and system of the present disclosure may collect identification information from a second vehicle involved in the vehicle incident, and determine a ranking for the potential causes of the vehicle incident. Vehicle incident data based on the collected information and the ranked list of potential causes may also be uploaded to a secure management cloud accessible by one or more trusted third-parties, such as insurance agencies, law enforcement and emergency units, municipalities, and the like. The present disclosure may provide benefits associated with determining the responsible party in vehicle incidents, and decreasing the number of vehicle incidents that go unreported.

Aspects of the present disclosure include a method and system for managing a vehicle incident. More particular aspects relate to providing incident data based on collected information regarding the vehicle incident. The method and system may work on a number of devices and operating systems. Aspects of the present disclosure include monitoring a first vehicle having a first vehicle state. The first vehicle state may include a set of physical condition characteristics. Monitoring may be performed in response to a triggering event. The triggering event may, for example, be an environmental stimuli such as an audio trigger, a motion-based trigger (e.g., another car moving in proximity to the first vehicle), an impact trigger, or a visual trigger.

Aspects of the present disclosure include detecting, for the first vehicle, a vehicle incident including a change of one or more physical condition characteristics of the set of physical condition characteristics. The first vehicle may be configured to detect the environmental stimuli using a sensor array having one or more sensors. As an example, the sensors can include cameras, microphones, motion sensors, and impact sensors. The vehicle incident may, for example, be an impact to the first vehicle from a second vehicle. The first vehicle may be stationary and unattended at the time of the vehicle incident.

Aspects of the present disclosure include collecting incident circumstance information including a set of potential causes of the vehicle incident. Collecting the incident circumstance information may be performed in response to detecting the vehicle incident for the first vehicle. Collecting the incident circumstance information may further include obtaining, from the second vehicle, identification information including one or more of a license plate number or a vehicle identification number. Further aspects of the present disclosure may include determining, based on the incident circumstance information, a security action. The security action may, as an example, include sending an alarm signal, locking the door or the ignition, or contacting an emergency response unit. In response to selecting the security action based on the incident circumstance information, the first action may be performed. In certain embodiments, determining the security action may be performed by a mobile application communicatively connected to the vehicle management system. Further aspects of the present disclosure are directed toward managing, using the mobile application, a set of operation settings for the sensor array of the first vehicle. In certain embodiments, the set of operation settings may be managed using an in-vehicle computer system.

Aspects of the present disclosure include providing incident data based on at least a portion of the incident circumstance information and at least a portion of the change of one or more physical condition characteristics. Providing the incident may also include transmitting, via a mobile application communicatively connected to the vehicle management system, an incident notification to a communication device identified with the first vehicle. Providing the incident data may also include uploading the incident data to a secure management cloud. Uploading the incident data to the secure management cloud may further include analyzing the set of potential causes of the vehicle incident, and determining a rank-order for the set of potential causes based on the incident data.

It is understood in advance that although this disclosure includes a detailed description on cloud computing, implementation of the teachings recited herein are not limited to a cloud computing environment. Rather, embodiments of the present invention are capable of being implemented in conjunction with any other type of general purpose or specialized computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics may include:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models may include:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are may include:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
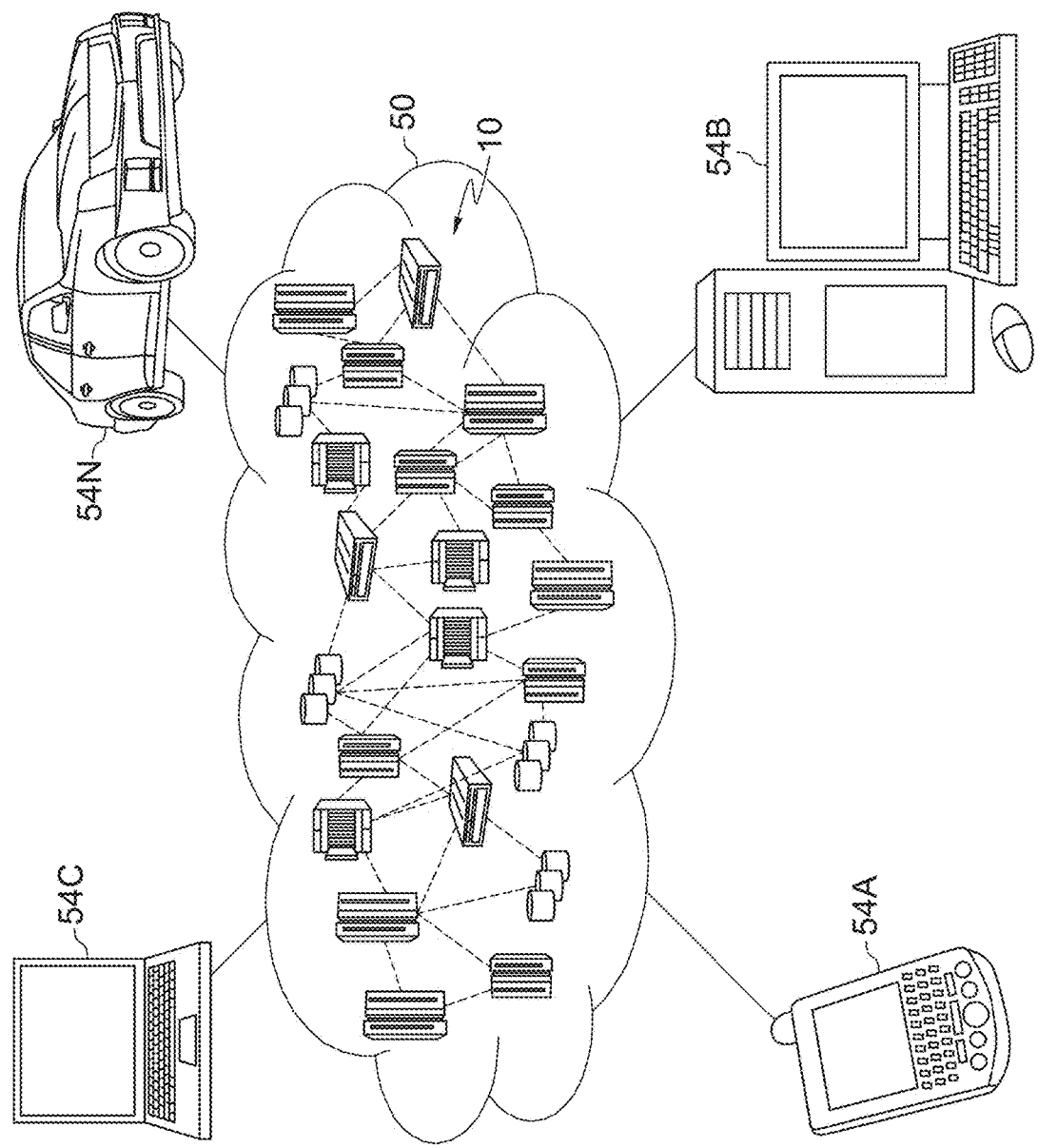
FIG. 2 depicts a cloud computing environment according to an embodiment of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
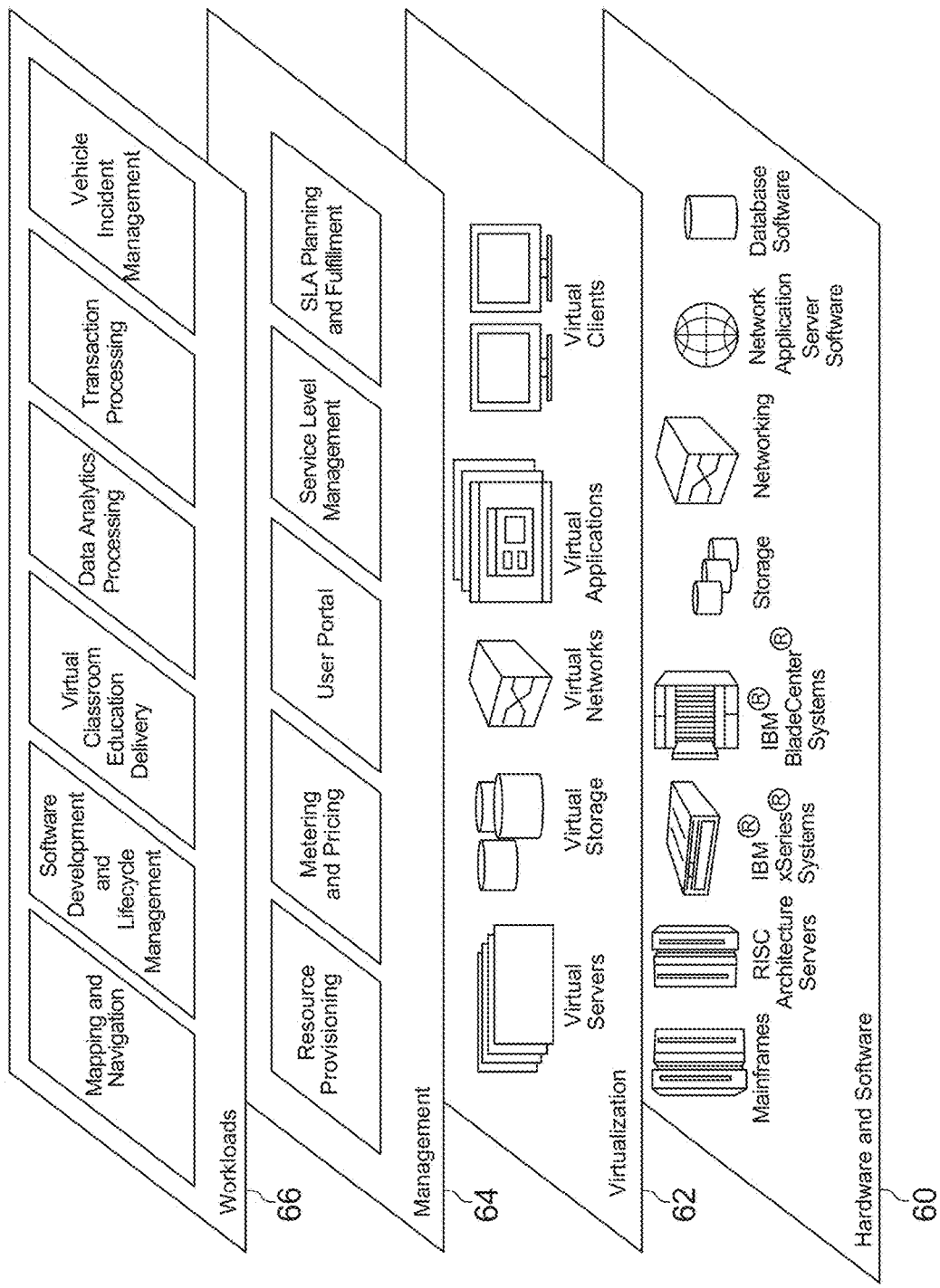
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and management of a vehicle incident.

Figure 4:
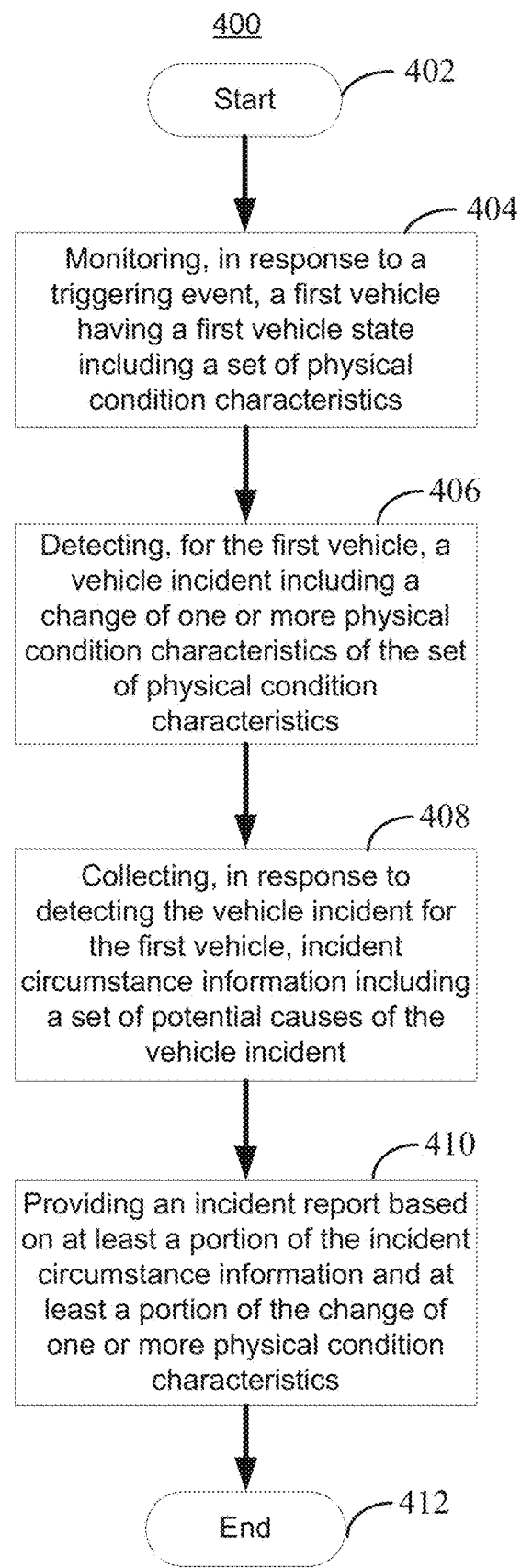
FIG. 4 is a flowchart of a method for managing a vehicle incident, according to an embodiment of the present disclosure.

FIG. 4 is a flowchart of a method 400 for managing a vehicle incident, according to embodiments of the present disclosure. Aspects of FIG. 4 are directed toward providing incident data based on collected incident circumstance information. The method 400 may begin at block 402 and end at block 412. Consistent with various embodiments, the method 400 can include a monitoring block 404, a detecting block 406, a collecting block 408, and a providing block 410.

Consistent with various embodiments, at block 404 the method 400 may include monitoring, in response to a triggering event, a first vehicle having a first vehicle state including a set of physical condition characteristics. In certain embodiments, the first vehicle may include an array of sensors configured to perform the monitoring. The array of sensors may, for example, include cameras, microphones, motion sensors, and impact sensors. Other types of sensors are also possible. In certain embodiments, the first vehicle may be an automobile such as a car, truck, bus, motorcycle, or other type of vehicle. The first state of the first vehicle state may include the physical condition of the first vehicle. More particularly, the first vehicle state may include information regarding the condition of one or more components of the first vehicle. For example, the first state may include information regarding the windshield, mirrors, body, doors, engine, tires, transmission, windows, fenders, radiator, electronic components, and other components of the first vehicle. In certain embodiments, information regarding the first vehicle state and the individual vehicle components may be maintained in a component database stored locally within memory of a computer system of the first vehicle. Alternatively, the database may be stored on a management cloud accessible by the first vehicle.

As described herein, in certain embodiments, monitoring the first vehicle may be performed in response to a triggering event. The triggering event may, in certain embodiments, include an environmental stimulus. More particularly, the triggering event may be an environmental stimulus such as an audio trigger, a motion-based trigger, an impact trigger, a weather-based trigger or a visual trigger. In certain embodiments, the environmental stimulus may be detected by a standby sensor of the first vehicle that remains active in a low-power mode. Other types of environmental triggers are also possible. As an example, a sudden loud noise such as the screech of tires of a nearby second vehicle may trigger the sensor array to begin monitoring the first vehicle. As an additional example, a sudden movement in the vicinity of the first car may trigger the sensor array to begin monitoring the first vehicle.

Consistent with various embodiments, at block 406, the method 400 can include detecting, for the first vehicle, a vehicle incident including a change of one or more physical condition characteristics of the set of physical condition characteristics. In certain embodiments, the primary user (e.g., driver, owner, insurance holder, etc.) of the first vehicle may not be in the vicinity of the first vehicle at the time of the vehicle incident. Further, the first vehicle may be stationary (e.g., in a park mode) at the time of the vehicle incident. As described herein, in certain embodiments, the vehicle incident may be detected by a sensor array of the first vehicle. In certain embodiments, the sensor array of the vehicle may activate when the vehicle is stationary (e.g., in a park mode.) Consider the following example. The primary user of the first vehicle may park his car in a parking lot when he or she enters a supermarket. A second vehicle may be backing out of a space in the parking lot, and impact the rear bumper of the first vehicle, resulting in a dent. The method 400 can detect impact to the bumper, and assess the extent of the damage. Further, in certain embodiments, detecting a change to one or more physical components of a first vehicle can also include assessing the extent of the damage and providing an estimate of the cost range that may be required to restore the condition of the vehicle component. In certain embodiments, the method 400 may update the component database with the change to the condition of the rear bumper. Multiple changes to multiple vehicle components in substantially the same time frame can also be detected, as well as multiple changes to the same vehicle component.

Consistent with various embodiments, at block 408, the method 400 can include collecting, in response to detecting the vehicle incident for the first vehicle, incident circumstance information including a set of potential causes of the vehicle incident. In certain embodiments, the incident circumstance information can be collected by the sensor array of the first vehicle. In certain embodiments, the incident circumstance information can include the type of incident (e.g., impact with a second vehicle, weather effects, etc.) time and date of the impact, audio or video recordings of the environment surrounding the first vehicle, and other data relevant to the vehicle incident.

In certain embodiments, the incident circumstance information can include a set of potential causes of the vehicle incident. Accordingly, in certain embodiments, the method 400 can include assessing the incident circumstance information, and determining one or more factors that may have been the cause of the vehicle incident. In certain embodiments, each factor may each be assigned a confidence value to indicate the likelihood of being the cause of the vehicle incident. As an example, a user may park a first vehicle in a parking lot overnight. In the morning, the user may notice one or more large dents in the body of the first vehicle. Accordingly, the method 400 may provide a list of potential causes of the vehicle incident, such as a door ding from a second vehicle, a hail storm that occurred overnight, and an inquisitive raccoon that investigated the vehicle. Based on audio and video information collected by the sensor array of the first vehicle, the method 400 may include assessing each potential cause, and assigning a confidence value to each potential cause using an algorithm configured to analyze data associated with each potential cause. In certain embodiments, the confidence value may be an integer value between 1 and 100. A greater confidence value may indicate a greater likelihood that the particular factor was the cause of the vehicle incident. For instance, the hail storm may be given a confidence score of 71, the door ding from the second vehicle may be given a confidence score of 24, and the inquisitive raccoon may be given a confidence value of 3.

Consistent with various embodiments, the vehicle incident may be a second vehicle impacting the first vehicle. Accordingly, in certain embodiments, collecting incident circumstance information can include obtaining identification information from the second vehicle. For example, the identification information could be a license plate number, a vehicle identification number, an image or video of the second vehicle, the make or model of the second vehicle, and distinguishing factors such as color or physical condition. The identification information can be obtained from the second vehicle in a number of ways. For example, in certain embodiments, both the first vehicle and the second vehicle may be equipped with communication systems, such as a Wi-Fi network, a mesh network, or other sort of communication system. In response to the vehicle incident, the first vehicle may send a request to the second vehicle via the communication system, and the second vehicle may provide the identification information. Alternatively, in certain embodiments, in response to the vehicle incident, the first vehicle and the second vehicle may automatically be configured to exchange identification information. Additionally, in certain embodiments, the sensor array of the first vehicle can be configured to obtain identification information from the second vehicle through images and captured video footage. Other methods of obtaining the identification information from the second vehicle are also possible.

Consistent with various embodiments, at block 410 the method 400 can include providing incident data based on at least a portion of the incident circumstance information and at least a portion of the change of one or more physical condition characteristics. For example, the incident data may include information collected from the sensor array of the first vehicle in response to the vehicle incident, as well as data regarding changes to the physical condition of one or more vehicle components. The incident data may also include the set of potential causes of the vehicle incident along with their respective confidence scores. As an example, in certain embodiments, the incident data may indicate that the vehicle incident happened at 2:31 PM on September $19^{th}$, caused minor damage to the rear bumper and the back-left taillight. The incident data may also indicate that three vehicles in the vicinity were potential causes of the incident; a maroon sedan with a license plate number of ABC 123 having a confidence score of 89, a tan SUV (sport utility vehicle) with a license plate number of DEF 456 having a confidence score of 25, and a yellow pick-up truck with a license plate number of GHI 789 having a confidence score of 11. The incident data may also include audio or video data that was collected in response to the vehicle incident.

Aspects of the present disclosure, in certain embodiments, are directed toward providing the incident data to one or more entities. Consistent with various embodiments, the incident data can be provided to a primary user (e.g., driver, owner, or insurance holder) of the first vehicle, as well as one or more third-party institutions, such as an insurance company, law enforcement unit, municipality, or other entity. In certain embodiments, providing the incident data can include transmitting, via a mobile application communicatively connected to the vehicle management system, an incident notification to a communication device identified with the first vehicle. In certain embodiments, the mobile application may be an incident management application configured to execute on a mobile device such as a tablet or smart phone. Accordingly, a mobile device of the primary user may be identified (e.g., synced) to the first vehicle, and may be configured to receive the incident data in response to a vehicle incident. Providing the incident data can also include uploading the incident data to a secure management cloud. The secure management cloud may be accessible by one or more third party institutions, such as an insurance company, a law enforcement unit, municipality, or other entity.

Further, consistent with various embodiments, aspects of the present disclosure are directed toward providing the incident data to a primary user of the second vehicle. In certain embodiments, the incident data may alert the primary user of the second vehicle that they have been identified as potentially responsible for the vehicle incident. The incident data may be provided to the primary user of the second vehicle in one of a number of ways. For instance, the incident data may be delivered directly to the vehicle through a communication system such as a mesh network or a Wi-Fi network. In certain embodiments, the incident data may be provided to a mobile communication device of the primary user of the second vehicle.

Uploading the incident data to the secure management cloud accessible by one or more third party institutions may be associated with a number of benefits. For example, a law enforcement unit may send a dispatch to the scene of the vehicle incident. As another example, a municipality may aggregate the incident data from multiple vehicles and determine that a particular location is a frequent scene of vehicle incidents. Accordingly, the municipality may take actions to reduce the number of vehicle incidents in the area (e.g., widening parking spaces, adding a stop sign or stop light, etc.). In certain embodiments, an insurance company may use the incident data to determine the responsibility party of a vehicle incident, and expedite the insurance claim process.

Aspects of the present disclosure, in certain embodiments, are directed toward determining, based on the incident circumstance information, a security action for the first vehicle. For example, the security action may include sending an alarm, locking the ignition or doors, or contacting an emergency response unit. In certain embodiments, multiple security actions may be determined. In certain embodiments, the security action may be determined automatically based on the incident circumstance information. For example, in response to an attempt to pry open one of the doors of the first vehicle, the security action may be determined to be an alarm as well as an automatic call to a law enforcement unit. In certain embodiments, the security action can be determined by a user via a mobile application communicatively connected to the vehicle management system. For example, in response to a vehicle incident, a primary user of the vehicle could receive a dialog box on his or her mobile device prompting the user to decide an appropriate security response. The security response could then be performed in response to the decision of the user. Additionally, in certain embodiments, the mobile application may be configured to manage a set of operation settings for the sensor array of the first vehicle. For example, the mobile application may provide options manually activate the sensor array, adjust the angle of the cameras, determine what sort of information is collected in response to a vehicle incident, and the like.

Figure 5:
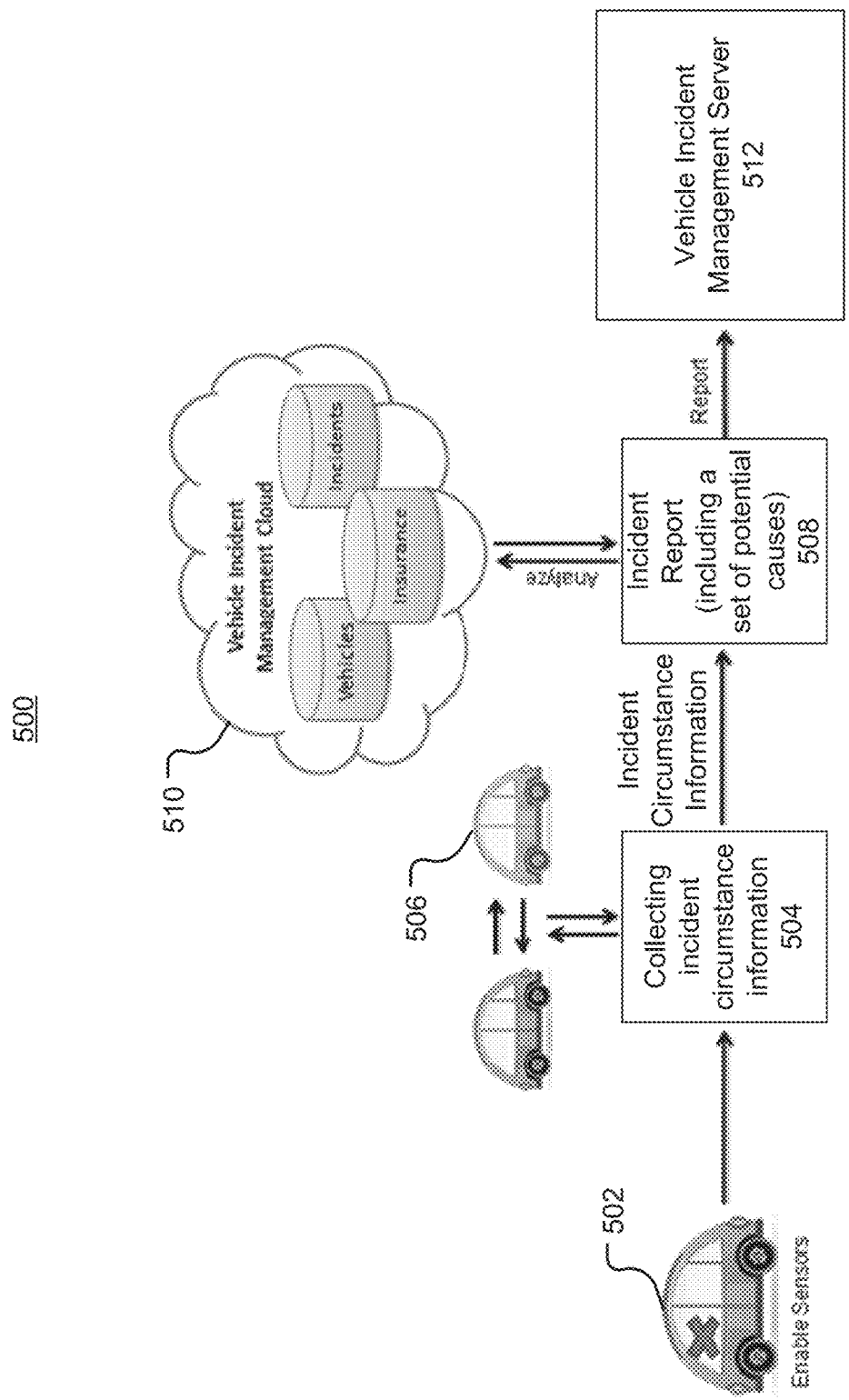
FIG. 5 is a workflow diagram illustrating an example scenario for managing a vehicle incident, according to an embodiment of the present disclosure.

FIG. 5 is a workflow diagram illustrating an example scenario 500 for managing a vehicle incident. Aspects of FIG. 5 are directed toward providing incident data including collected incident circumstance information to a vehicle incident management cloud 510 and a vehicle incident management server 512. As shown in FIG. 5, the scenario 500 can include a first vehicle 502, a collecting block 504, a second vehicle 506, an incident data block 508, a vehicle incident management cloud 510, and a vehicle incident management server 512.

Consistent with various embodiments, the first vehicle 502 may enable a sensor array to begin monitoring the first state of the first vehicle in response to a triggering event. For example, a standby sensor of the first vehicle may detect a vibration, a loud noise, or a sudden movement, and begin monitoring the first state of the first vehicle in response. In certain embodiments, the first vehicle may be involved in a vehicle incident with a second vehicle 506. For example, the vehicle incident may be an impact to the first vehicle from the second vehicle. In certain embodiments, the first vehicle may be in a park mode, and the primary user (e.g., vehicle driver, owner, insurance holder, etc.) may not be nearby (e.g., within sight, hearing range, etc.) the first vehicle.

Consistent with various embodiments, at block 504, the example scenario 500 can include collecting incident circumstance information. In certain embodiments, the incident circumstance information may be collected by the sensor array (e.g., cameras, microphones, vibration sensors, impact sensors, motion sensors, etc.) of the first vehicle. The incident circumstance information can include the type of incident (e.g., impact with a second vehicle, weather effects, etc.) time and date of the impact, audio or video recordings of the environment surrounding the first vehicle, as well as a potential list of causes of the vehicle incident. In certain embodiments, the first vehicle and the second vehicle may be equipped with a communication system (e.g., a mesh network, Wi-Fi network, etc.) and be configured to exchange identification information including license plate number, vehicle manufacturer, model, color, vehicle identification number, and other information that may be used to identify the vehicles.

At block 508, the example scenario 508 can include providing incident data to one or more entities. For example, as shown in FIG. 5, the incident data may be provided to a vehicle incident management cloud 510 and a vehicle incident management server 510. In certain embodiments, the incident data may include a list of potential causes of the vehicle incident, with respective confidence values. In certain embodiments, the incident data may be provided to the vehicle incident management cloud 510, where it may be accessible by one or more organizations, such as insurance companies, law enforcement units, municipalities, and other institutions. Accordingly, the incident data may be used to determine a responsible party for the vehicle incident (e.g., for insurance claim purposes), identify a user in need of assistance (e.g., by a law enforcement or emergency unit), or identify that a certain location is a frequent scene of vehicle incidents, and may require government action to make it safer.

Consistent with various embodiments, the example scenario 508 can include providing the incident data to a vehicle incident management server 510. The vehicle incident management server 510 may, in certain embodiments, be configured to maintain incident data in a database. In certain embodiments, the vehicle incident management server 510 may be configured to send the vehicle incident data to one or more mobile communication devices identified with the first vehicle. The vehicle incident management server 510 may also prompt a user for a response via the mobile communication device. For example, the user could indicate that the first vehicle should lock its doors, ignition, or turn on a vehicle alarm. The server 510 may be configured to relay the response of the user to the first vehicle, which may perform the action.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for managing a vehicle incident, the system comprising:
a standby sensor of a first vehicle, the standby sensor configured to remain active in a low-power mode and to detect an environmental stimulus;
an array of sensors configured to activate in response to the standby sensor detecting the environmental stimulus, wherein the array of sensors is configured to monitor a respective physical condition of one or more components of the first vehicle and to collect incident circumstance information in response to detecting an impact to the first vehicle that caused damage to at least one of the one or more components of the first vehicle;
a processing unit communicatively coupled to the standby sensor and to the array of sensors, wherein the processing unit is configured to generate a list of a plurality of potential sources of the impact that caused the damage to the at least one of the one or more components based on the incident circumstance information, wherein each source of the plurality of sources is a physical object external to the first vehicle;
wherein the processing unit is configured to analyze respective incident circumstance information associated with each source of the plurality of potential sources to assign a respective confidence value to each potential source of the impact that caused the damage to the at least one of the one or more components, each respective confidence value representing a likelihood that each potential source is the source of the impact to the first vehicle; and an interface communicatively coupled to the processing unit and configured to output the list of potential sources with the respective assigned confidence values.

2. The system of claim 1, wherein the processing unit is configured to determine a rank-order for the plurality of potential sources based on the respective confidence score assigned to each of the plurality of sources.

3. The system of claim 1, wherein the plurality of sources includes at least one weather-related object.

4. The system of claim 1, wherein the plurality of sources includes at least one animal.

5. The system of claim 1, wherein the plurality of sources includes a plurality of vehicles;

wherein the respective confidence value assigned to each of the plurality of vehicles represents the respective likelihood that each of the plurality of vehicles is the source of the impact to the first vehicle that caused the damage to the at least one of the one or more components.

6. The system of claim 1, wherein the standby sensor comprises a motion sensor configured to detect a sudden movement in a vicinity of the first vehicle.

7. The system of claim 1, wherein the standby sensor comprises an audio sensor configured to detect a sudden noise in a vicinity of the first vehicle.

8. The system of claim 1, wherein the standby sensor comprises a parking sensor configured to detect when the first vehicle is placed in a park mode.

9. The system of claim 1, further comprising a memory configured to store information regarding the respective monitored physical condition of the one or more components of the first vehicle.

10. The system of claim 1, wherein the interface is configured to output the list of potential sources with the respective assigned confidence values to a mobile device of a primary user of the first vehicle.

11. A computer program product comprising a non-transitory computer readable storage medium having a computer readable program stored therein, wherein the computer readable program, when executed on a first computing device, causes the first computing device to:

activate a sensor array of a first vehicle in response to an environmental stimulus detected by a standby sensor of the first vehicle, the sensor array configured to monitor a respective physical condition of one or more components of the first vehicle;

receive incident circumstance information from the sensor array in response to the sensor array detecting an impact to the first vehicle that caused damage to at least one of the one or more components;

generate a list of a plurality of potential sources of the impact that caused the damage to the at least one of the one or more components based on the incident circumstance information, wherein each source of the plurality of sources is a physical object external to the first vehicle;

analyze respective incident circumstance information associated with each source of the plurality of potential sources to assign a respective confidence value to each potential source of the impact that caused the damage to the at least one of the one or more components, each respective confidence value representing a likelihood that each potential source is the source of the impact to the first vehicle; and output the list of potential sources with the respective assigned confidence values.

12. The computer program product of claim 11, wherein the computer readable program is further configured to cause the first computing device to determine a rank-order for the plurality of potential sources based on the respective confidence score assigned to each of the plurality of sources.

13. The computer program product of claim 11, wherein the plurality of sources includes at least one weather-related object.

14. The computer program product of claim 11, wherein the plurality of sources includes at least one animal.

15. The computer program product of claim 11, wherein the plurality of sources includes a plurality of vehicles; and wherein the respective confidence value assigned to each of the plurality of vehicles represents the respective likelihood that each of the plurality of vehicles is the source of the impact to the first vehicle that caused the damage to the at least one of the one or more components.

16. The computer program product of claim 11, wherein the standby sensor comprises a motion sensor configured to detect a sudden movement in a vicinity of the first vehicle.

17. The computer program product of claim 11, wherein the standby sensor comprises an audio sensor configured to detect a sudden noise in a vicinity of the first vehicle.

18. The computer program product of claim 11, wherein the standby sensor comprises a parking sensor configured to detect when the first vehicle is placed in a park mode.

19. The computer program product of claim 11, wherein the computer readable program is further configured to cause the first computing device to store information regarding the respective monitored physical condition of the one or more components of the first vehicle in a memory communicatively coupled to the first computing device.

20. The computer program product of claim 11, wherein the computer readable program is further configured to cause the first computing device to output the list of potential sources with the respective assigned confidence values to a mobile device of a primary user of the first vehicle.

\* \* \* \* \*